United States Patent [19]
Adam

[11] 3,911,357
[45] Oct. 7, 1975

[54] DEVICE FOR TESTING THE CONTINUITY OF AN ELECTRICAL NETWORK DEPOSITED ON A GLASS SHEET

[75] Inventor: Amos Adam, Lozere, France

[73] Assignee: Boussois S.A., Paris, France

[22] Filed: Mar. 4, 1974

[21] Appl. No.: 448,044

[30] Foreign Application Priority Data
Mar. 13, 1973 France .............................. 73.08826

[52] U.S. Cl. .................................. 324/51; 324/52
[51] Int. Cl.² ......................................... G01R 31/02
[58] Field of Search ............................ 324/51, 52

[56] References Cited
UNITED STATES PATENTS

| | | | |
|---|---|---|---|
| 754,402 | 3/1904 | Wiseman .............................. | 324/52 |
| 2,127,216 | 8/1938 | Hallden et al. ....................... | 324/52 |
| 2,823,350 | 2/1958 | Macleish .............................. | 324/52 |
| 2,832,042 | 4/1958 | Lambert ............................... | 324/52 |
| 3,333,186 | 7/1967 | Mowery ................................ | 324/51 |
| 3,571,561 | 3/1971 | Ando ............................... | 324/51 X |
| 3,590,371 | 6/1971 | Shaw .................................... | 324/51 |
| 3,725,779 | 4/1973 | Mauer .................................. | 324/51 |

*Primary Examiner*—Gerard R. Strecker
*Attorney, Agent, or Firm*—Young & Thompson

[57] ABSTRACT

A set of resistive strips each divided into two portions by a test point is connected to two terminals and constitutes a network to be tested for electrical continuity. The end terminals of two current sources mounted in series are connected to the network terminals, the junction point of the two sources is connected to one terminal of a detector and the other terminal is connected to a test point of one resistive strip. A flow of current through the detector indicates a discontinuity within one portion of the corresponding resistive strip.

7 Claims, 5 Drawing Figures

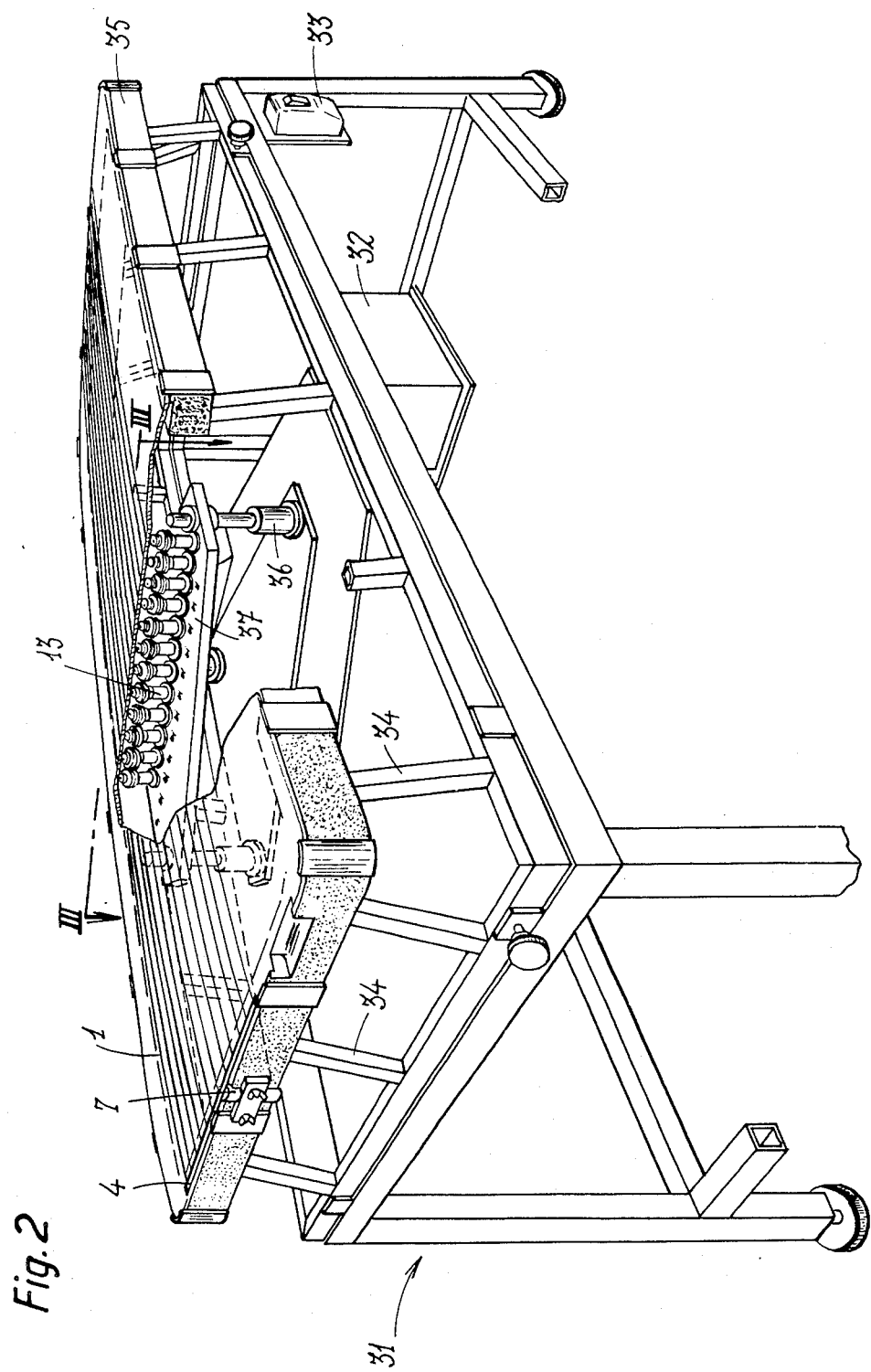

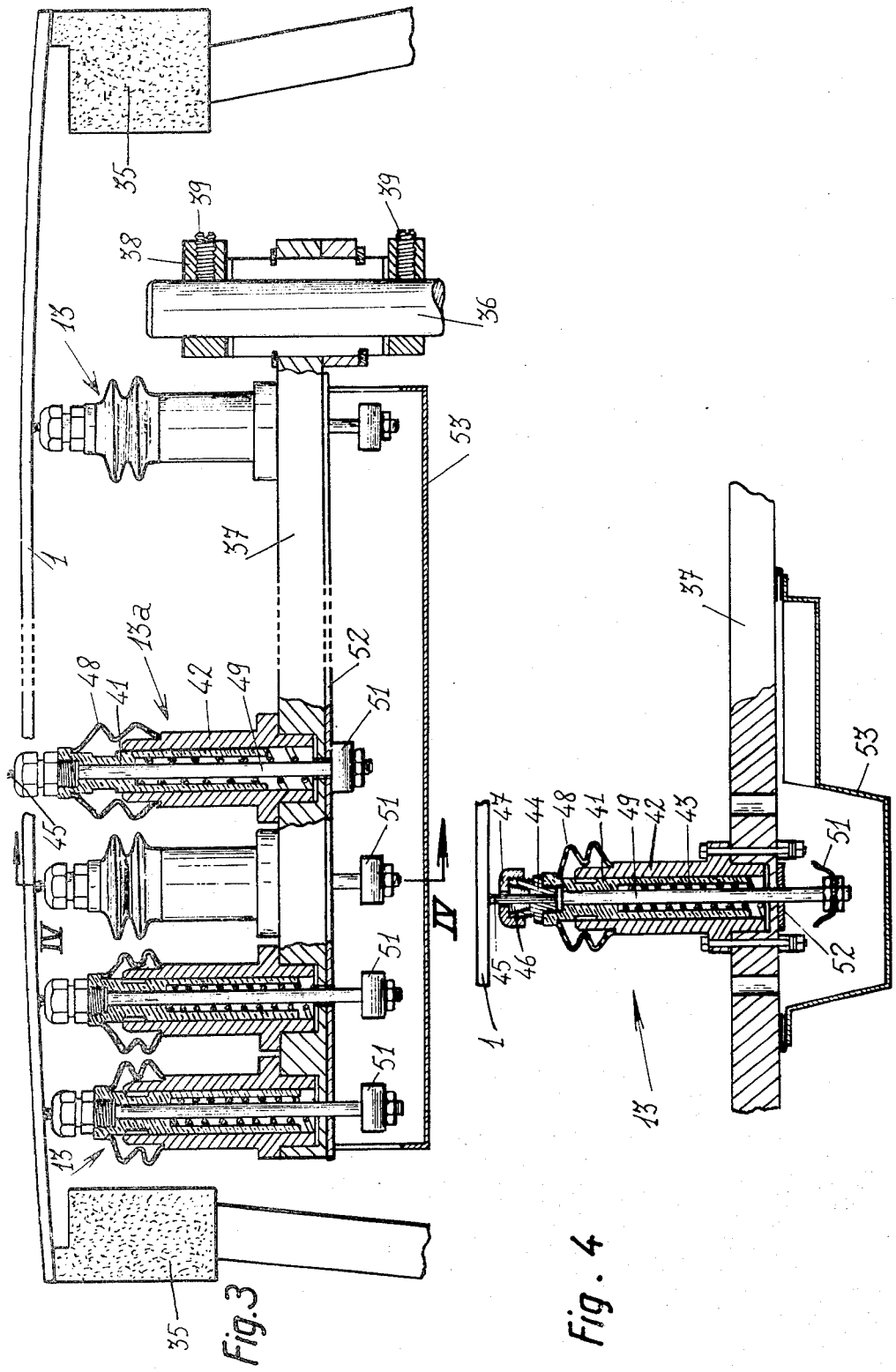

DEVICE FOR TESTING THE CONTINUITY OF AN ELECTRICAL NETWORK DEPOSITED ON A GLASS SHEET

This invention relates to testing the continuity of a two-terminal electrical network which is deposited on a glass sheet or like insulating support.

The invention applies in particular to the testing of electrical heating networks deposited on the rear windows of motor vehicles.

It is known that the electrical heating networks under consideration are constituted by a set of resistive strips placed in parallel and connected to the two terminals of the network.

In order to manufacture networks of this type, strips of electrically conductive paste are first deposited on a glass sheet, the sheet thus coated being then inserted into a furnace in order to bake the paste as well as to shape and anneal the glass sheet.

The blank thus obtained then undergoes a dimensional test by means of a template, for example, followed by an electrical continuity test made on the resistive elements of the network.

The resistive strips are then reinforced by electroforming, for example by deposition of copper followed by deposition of nickel. A final test is then carried out.

The intermediate test made prior to the reinforcement stage is very important since it is possible at this stage to repair a resistive strip which has been found to be defective. On the contrary, if a resistive strip is found to have a break in continuity during the final test, the entire network has to be rejected together with the glass sheet which serves as a support for this latter.

The intermediate continuity test can be performed by visual inspection of each resistive strip with a magnifying glass. An inspection of this type is clearly time-consuming and tedious. Moreover, it is necessary to wait until the glass sheet which has just been annealed has cooled to a sufficient extent. Finally, it is apparent that defective strips may be overlooked in this method of inspection.

A method of intermediate continuity testing based on a so-called "inductive" method has already been described, especially in the Addition No. 96,087 to French Pat. No. 1,464,585. A current is passed through the network to be tested and the unitary magnetic field produced by the current which flows through each resistive strip of the network is detected by means of an electromagnetic transducer. A method of this type takes a long time and is also sensitive to surrounding stray electromagnetic fields. Finally the signal delivered by the transducer is weak and this calls for the use of a fairly complicated electronic circuit which is responsive to temperature. In consequence, this method is inapplicable in a warm room or before the blank has completely cooled.

The primary object of the invention is to overcome these disadvantages by providing a device for the rapid and reliable testing which is practically insensitive to temperature variations and to stray electromagnetic fields.

In accordance with the invention, the testing of the continuity of a two-terminal electrical network deposited on a glass sheet and comprising at least two resistive strips connected in parallel to the terminals of said network and each having at least one accessible test point which divides said strips into two portions having ohmic values which are in a ratio K with respect to each other is achieved by a device that performs the following steps: two current sources having electromotive forces in a ratio K with respect to each other are mounted in series, the end terminals of said two sources are connected to the terminals of the network, the junction point of the two sources is connected to one terminal of at least one current-detecting system and the other terminal of said detector is connected to the test point of one of the resistive elements of the network, the flow of current within the detector being intended to indicate a break in continuity within one of the portions of the corresponding resistive element.

The device comprises a support for the glass sheet on which the electrical network is deposited, two end terminals and one intermediate supply terminal which are intended to be connected to two current sources in series having electromotive forces in a ratio K with respect to each other, detachable connecting means between each end supply terminal and the terminals of the network, and at least one detecting system connected on the one hand to the intermediate supply terminal and on the other hand to a feeler which is adapted to establish an electric contact between the detector and the test point of one resistive element of the network.

The current detector is practically insensitive to stray electromagnetic fields and can readily be made insensitive to temperature variations below approximately 60° centigrade. The blanks can thus be tested shortly after they are delivered from the annealing furnace.

In a preferred embodiment of the invention, the device comprises a number of detecting systems equal to the number of resistive strips of the network and each system aforesaid comprises two unidirectional detectors such as luminescent diodes mounted in parallel with opposite polarities with respect to each other, the sources employed being direct-current sources.

It is thus possible to test simultaneously all the resistive elements of the network and to detect any break in continuity which may be present in the two portions of a resistive element.

In one advantageous embodiment of the invention, the glass sheet support is a dimension-checking template which serves to make tests both of continuity and dimensions by means of the same device without any need to handle the glass sheet between these two tests.

Further properties and advantages of the invention will become apparent from the detailed description which follows below.

A preferred embodiment of the invention is illustrated in the accompanying drawings which are given by way of example without any limitation being implied, and in which:

— FIG. 2 is a perspective view of a testing device in accordance with the invention;

— FIG. 3 is a part-sectional view to a larger scale and taken along line III—III of FIG. 2;

— FIG. 4 is a part-sectional view taken along line IV—IV of FIG. 3;

Figure 1:
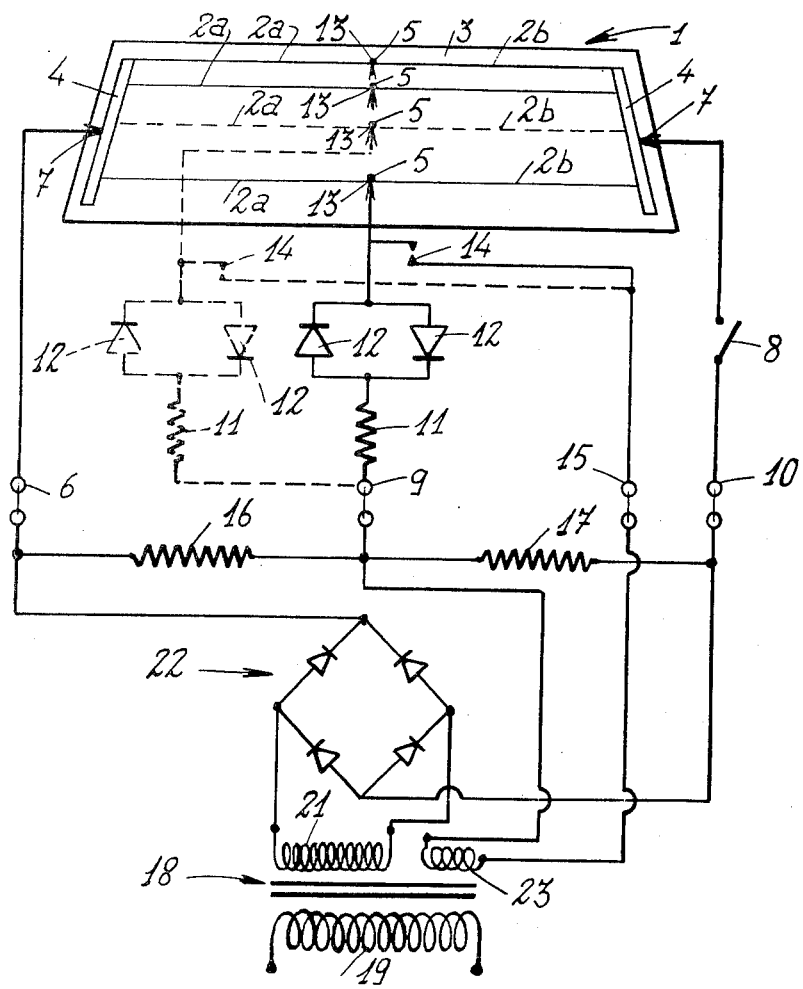
— FIG. 1 is a circuit diagram of a device in accordance with the invention.

The testing device in accordance with the invention is shown in the electrical diagram of FIG. 1 in which the method according to the invention is also illustrated.

An electrical network which is a heating network for the rear window 1 of a motor vehicle in the example illustrated is formed of resistive strips designated by the general reference 2 and deposited on a glass sheet 3. The strips 2 are formed by means of an electrically conductive paste having a composition which is known per se. The method and the device which will be described below are intended to permit testing of the electrical continuity of said strips 2 after these latter have been subjected to a baking process in a high-temperature furnace during which the sheet 3 is shaped and annealed and before said strips have been reinforced by electroforming.

The resistive strips 2 are connected in parallel to each other by means of two collectors 4 which constitute the terminals of the network. Each strip 2 has at least one test point 5 which is accessible and divides said strip into two portions 2a and 2b, the ohmic values of which are in a ratio K.

Two supply terminals 6 and 10 are connected to the terminals 4 of the network by means of detachable connectors 7. A switch 8 is mounted between the terminal 10 and one of the connectors 7.

An intermediate supply terminal 9 is connected through a protective resistor 11 to a current detector which, in the preferred embodiment shown, comprises two electroluminescent diodes 12 mounted in parallel relation with opposite polarities with respect to each other. Said current detector is also connected to a feeler 13 which is so designed as to establish an electric contact with the test point 5 of one of the resistive strips 2.

A switch 14 is mounted between the feeler 13 and an auxiliary supply terminal 15 which is intended to be connected to an auxiliary current source as will become apparent hereinafter.

The device preferably comprises a number of current detectors and feelers 13 corresponding to the number of resistive strips in the network to be tested. All these detectors each have one terminal connected to the intermediate terminal 9, the different feelers 13 being intended to come into contact with the different test points 5 as can be seen from FIG. 1.

The terminals 6, 9 and 10 are intended to be connected to two direct-current sources mounted in series, the electromotive forces of which are in the ratio K with respect to each other. The junction point of the two sources is connected to the intermediate terminal 9.

In the preferred embodiment which is illustrated, said two current sources are formed by means of a single source connected between the end supply terminals 6 and 10. To this end, two resistors 16 and 17 are connected between the intermediate terminal 9 and the terminal 6 or 10 respectively. The ohmic values of the resistors 16 and 17 are in the ratio K with respect to each other. The theory of electric circuits teaches that this circuit arrangement is equivalent to two sources in series, the electromotive forces of which are in a ratio K with respect to each other and the junction point of which is connected to the intermediate terminal 9.

The single direct-current source comprises in conventional manner a transformer 18 in which the primary winding 19 is intended to be connected to an alternating-current source and which comprises a first secondary winding 21 connected to a rectifier bridge 22.

A second secondary winding 23 of the transformer 18 constitutes the auxiliary current source which was mentioned earlier and which is connected between the intermediate terminal 9 and the auxiliary supply terminal 14.

Continuity testing is accomplished in the following manner:

After connecting the current sources to the supply terminals 6, 9, 10 and 15 and preferably before connecting the connectors 7 to the terminals 4 of the network to be tested, the switches 14 are closed. The auxiliary source 23 is then connected to the terminals of the detecting systems with a view to ensuring that these latter are in good working order; all the electroluminescent diodes 12 must be in the luminescent state and if one of these latter remains extinguished, it must be replaced. The switches 14 are opened before proceeding to the following stage.

The connectors 7 are then connected to the terminals of the network and the switch 8 is closed. Since the ohmic values of the portions 2a and 2b of the resistive strips of the network are in the same ratio K with respect to each other as the ohmic values of the resistors 16 and 17, the test points 5 are at the same potential as the intermediate terminal 9 if the resistive strips 2 are in good condition. In this case, all the electroluminescent diodes are extinguished.

If one portion 2a or 2b of a resistive strip shows a break in continuity, the corresponding test point 5 is at a potential which is either higher or lower, as the case may be, than the potential of the terminal 9. One of the corresponding diodes 12 then lights up and indicates the particular portion 2a or 2b which is defective.

If both portions 2a and 2b of one and the same resistive strip have a break in continuity, the two corresponding diodes 12 remain extinguished. The defect is therefore not detected at this stage but will be detected during the following stages in which the switch 8 is opened.

Under these conditions, if a discontinuity exists in both portions 2a and 2b of the same resistive strip, the two corresponding diodes remain extinguished since the test point 5 of the strip under consideration is not connected to any of the terminals 4 of the network.

On the contrary, if only one portion of a strip has a discontinuity, its test point 5 is connected to the supply terminal 6 through the sound portion of said strip and the other resistive strips which are in good condition, and one of the corresponding diodes 12 lights up. Similarly, one diode lights up for each strip which is completely sound.

In short, it is clear that those strips which have a break in only one portion are detected in the initial stage by lighting-up of a diode whilst those strips which have a break in both portions are detected in the second stage by extinction of the two corresponding diodes.

As is readily understood, it is thus possible to detect not only a portion of resistive strip in which there is a complete interruption but also any portion which has an abnormally high resistance.

There will now be described one industrial construction of a device for the application of the method hereinabove described, the electrical diagram of the device being in accordance with FIG. 1.

A work table 31 (shown in FIG. 2) supports at the bottom portion thereof a supply box 32 which contains the transformer 18, the rectifier bridge 22 and the resistors 16 and 17, a general switch 33 being also provided in the primary circuit of the transformer.

Struts 34 support a frame 35 which serves both as a support for the heating window 1 and as a template for the dimensional checking of said window. There are mounted on the frame 35 the connectors 7 which are intended to establish an electric contact with the collectors 4 of the heating network.

Figure 5:
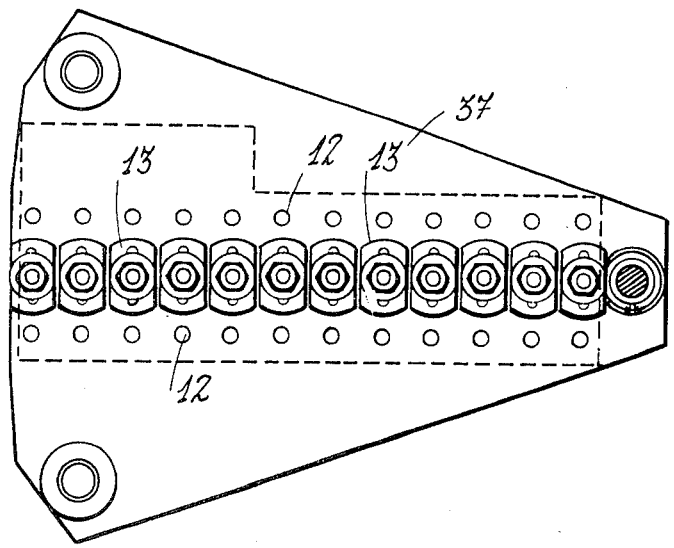
— FIG. 5 is a general plan view of the feelers and detectors of the device shown in FIG. 2.

In the central portion thereof, the table 31 supports by means of columns 36 an insulating plate 37 on which are mounted the feelers 13 and the diodes 12, said plate being shown in detail in FIGS. 3 to 5. It is apparent in particular from FIG. 3 that the ends of the columns 36 are capable of sliding within sleeves 38 secured to the plate 37 in order that the position of said plate may be adjusted with a view to ensuring that the feelers are applied against the heating window under a suitable pressure. Lock-screws 39 secure the plate 37 in position after adjustment.

The feelers 13 are placed in line and this line coincides with the line of the test points 5 of the resistive strips of the network when the heating window is placed in position of the frame 35. The diodes 12 are disposed in parallel lines on each side of the line of feelers (as shown in FIG. 5). The spacing between the feelers is equal to the spacing between the strips of the network.

Each feeler comprises a plunger 41 (as shown in FIG. 4) of electrically conductive material, said plunger being slidably fitted within an insulating cylinder 42 which is secured to the plate 37.

A spring 43 bears on the plate 37 and tends to maintain the head of the piston 41 in an outwardly extending position with respect to the cylinder 42.

An end-piece 44 is screwed into the head of the plunger 41 and a bundle 45 of thin wires is inserted in the axis of said end-piece, said wires being intended to come into contact with a test point 5 of a strip of the network. The bundle 45 is also head in position by means of a frusto-conical ring 46 maintained by a nut 47 which is screwed onto the end-piece 44. A bellows seal 48 prevents dust particles and other impurities from penetrating between the plunger 41 and the cylinder 42.

The plunger 41 is rigidly fixed to a conductive rod 49 which is connected by means of leads not shown in the drawings to the diodes 12 which are placed on each side of the feeler. The extremity of the rod 49 carries a resilient conductive strip 51 which, when the heating window 1 is not in position on the frame and the plunger 41 projects from the cylinder 42 of the maximum extent as shown in position 13a in FIG. 3, establishes an electric contact with a conductive strip 52 which is attached to the plate 37 along the line of feelers 13 and connected electrically to the auxiliary supply terminal 15. The resilient strip 51 and the conductive strip 52 correspond to the switch 14 of FIG. 1. A casing 53 protects the complete assembly of switches and the connections with the diodes 12.

When the heating window 1 is not in position on the frame 35, all the feeler heads project to the maximum extent as shown in position 13a in FIG. 3. The resilient strips 51 are in contact with the conductive strip 52, with the result that the auxiliary current source 23 (shown in FIG. 1) is connected to the terminals of the detecting systems. It is consequently possible to check at a single glance whether all the diodes 12 are lighted up.

When the window 1 is placed in position on the frame 35, the plungers of the feelers are thrust back as shown in FIG. 3 and the resilient strips 51 are separated from the conductive strip 52. The diodes 12 are then extinguished except for those which correspond to a defective strip.

Under these conditions, continuity testing is carried out very rapidly with a minimum number of handling operations since it is only necessary to place the heating window in position on its support, to note the diodes which remain lighted, then to open the switch 8 (not shown in FIGS. 3 to 5) and to note the pairs of diodes which remain extinguished.

The influence of surrounding electromagnetic fields is quite obviously negligible. The device does not comprise any element which is sensitive to temperature variations as long as the temperature does not exceed about 50°, with the result that the windows can be tested within the actual furnace room without waiting for them to cool down completely.

Further time is saved by virtue of the fact that the dimension-checking operation is carried out by means of the same device which serves to make tests for electrical continuity.

The effectiveness of the device in accordance with the invention is clearly demonstrated by the results obtained during a campaign for the production of heating windows.

Thus, when the so-called "inductive" method was employed for the intermediate continuity test, over 3 percent of the windows had to be rejected at the time of final testing. This percentage fell to approximately 0.4 % after the device in accordance with the invention was used since practically all faulty windows were detected at the time of the intermediate test and repaired. It is worthy of mention that this result was obtained by members of glassworks personnel who were not yet fully trained and that even better results may be expected.

It is wholly apparent that the invention is not limited to the embodiment which has just been described and that many alternative forms of execution can be contemplated without thereby departing from the scope of the invention. Thus it is possible to employ a single switch 14 for controlling all the detecting systems. Said systems can be galvanometers or any other current detector of known type. Alarm systems such as indicator lamps or sound systems can also be associated with the current detectors.

I claim:

1. A device for testing the continuity of a two-terminal electrical network deposited on a glass sheet and comprising at least two resistive strips connected in parallel to each other and in series between the terminals of said network and each having at least one accessible test point which divides said strips into two portions having ohmic values which are in a ratio K relative to each other, said device comprising at least one detecting system, wherein said device comprises a frame for holding the glass sheet on which the electrical network is deposited, two end terminals connected to end terminals of two direct current sources in series and one intermediate supply terminal connected to the intermediate terminal between said sources, said sources having electromotive forces in said ratio K relative to each other, detachable connecting means between each end supply terminal and the terminals of the network, a feeler for establishing an electrical contact between the test point of one resistive strip of said network and said detecting system, which is connected on the one hand to said feeler and on the other hand to said intermediate supply terminal, a fourth supply terminal connected to one end of an auxiliary current source whilst the other end of said source is connected to said intermediate supply terminal, and means for connecting said fourth supply terminal to said feeler.

2. A device according to claim 1, wherein said device comprises two resistors mounted in series between the end supply terminals, the junction point of said resistors being connected to the intermediate supply terminal and the ohmic values of said resistors being in a ratio of K relative to each other so as to constitute two current sources from a single current source which is connected to the end supply terminals.

3. A device for testing the continuity of a two-terminal electrical network deposited on a glass sheet and comprising at least two resistive strips connected in parallel to each other and in series between the terminals of said network and each having at least one accessible test point which divides said strips into two portions having ohmic values which are in a ratio K relative to each other, said device comprising at least one detecting system, wherein said device comprises a frame for holding the glass sheet on which the electrical network is deposited, two end terminals connected to end terminals of two direct current sources in series and one intermediate supply terminal connected to the intermediate terminal between said sources, said sources having electromotive forces in said ratio K relative to each other, detachable connecting means between each end supply terminal and the terminals of the network, a feeler for establishing an electrical contact between the test point of one resistive strip of said network and said detecting system, which is connected on the one hand to said feeler and on the other hand to said intermediate supply terminal, and detecting systems which are equal in number to the resistive strips of the network, each detecting system being connected on the one hand to said intermediate supply terminal and on the other hand to a said feeler, each feeler comprising a plunger slidably mounted within a stationary cylinder and subjected to the action of an elastic restoring system, the plunger supporting at one end a bundle of wires in contact with the network and at the other end a rod providing a connection with a said detecting system.

4. A device according to claim 3, wherein all the feelers are mounted in line on an insulating support, the spacing between the feelers being equal to the spacing between the resistive strips of the network and wherein the feeler support is fixed on said frame in order that the line of feelers should coincide with the line of test points of the resistive strips of said network when the glass sheet is applied on said frame.

5. A device according to claim 4 and comprising a fourth supply terminal to be connected to one end of an auxiliary current source whilst the other end of said source is connected to the intermediate supply terminal, and means for connecting said fourth supply terminal to all the feelers, wherein the plunger rod of each feeler is adapted to actuate a switch connected between said feeler and the fourth supply terminal, said switch being normally closed and being opened when the glass sheet is applied on said frame.

6. A device according to claim 5, wherein the switch associated with each feeler comprises a metallic strip secured to the feeler support and disposed along the line of feelers and a contact strip connected elastically to the plunger rod of the corresponding feeler.

7. A device according to claim 3, wherein said device comprises two resistors mounted in series between the end supply terminals, the junction point of said resistors being connected to the intermediate supply terminal and the ohmic values of said resistors being in a ratio of K relative to each other so as to constitute two current sources from a single current source which is connected to the end supply terminals.

* * * * *